US010585838B2

(12) United States Patent
Dantin

(10) Patent No.: US 10,585,838 B2
(45) Date of Patent: Mar. 10, 2020

(54) INPUT/OUTPUT DEVICE FOR AN ELECTRONIC CABINET AND CABINET COMPRISING SUCH A DEVICE

(71) Applicant: AIRBUS SAS, Blagnac (FR)

(72) Inventor: Benoît Dantin, Epinay sur Seine (FR)

(73) Assignee: Airbus SAS, Blagnac (FR)

( * ) Notice: Subject to any disclaimer, the term of this patent is extended or adjusted under 35 U.S.C. 154(b) by 199 days.

(21) Appl. No.: 15/036,807

(22) PCT Filed: Oct. 16, 2014

(86) PCT No.: PCT/EP2014/072203
§ 371 (c)(1),
(2) Date: May 14, 2016

(87) PCT Pub. No.: WO2015/071043
PCT Pub. Date: May 21, 2015

(65) Prior Publication Data
US 2016/0267042 A1    Sep. 15, 2016

(30) Foreign Application Priority Data
Nov. 15, 2013    (FR) ..................................... 13 61177

(51) Int. Cl.
*G06F 13/42* (2006.01)
*G06F 13/40* (2006.01)
(Continued)

(52) U.S. Cl.
CPC .......... *G06F 13/4221* (2013.01); *G06F 13/20* (2013.01); *G06F 13/409* (2013.01); *H04B 1/40* (2013.01); *H04B 10/27* (2013.01)

(58) Field of Classification Search
CPC .... G06F 13/20; G06F 13/409; G06F 13/4221; H04B 1/40; H04B 10/27
See application file for complete search history.

(56) References Cited

U.S. PATENT DOCUMENTS 8,078,215 B2    12/2011  Becker
2004/0166905 A1*  8/2004  Cherniski ............... G06F 1/183
                                                     455/575.1
(Continued)

FOREIGN PATENT DOCUMENTS

FR    2 969 898 A1    6/2012

OTHER PUBLICATIONS

"GLX/SLX4000 Series Port Cards," Dec. 31, 2009, http://www.cwcdefense.com/products/networking-switching/physical-layer-switches/slx4000.html.
(Continued)

*Primary Examiner* — Eric T Oberly
(74) *Attorney, Agent, or Firm* — Greer, Burns & Crain, Ltd.

(57) ABSTRACT

An input/output device for an electric or electronic cabinet grouping together a plurality of devices such as computers. The input/output device includes input/output channels, conversion units and at least one computing unit. The conversion unit is connected to the input/output channels and to the computing unit. A digital network link protocol management unit is connected to the computing unit and to at least one transceiver. The computing unit executes software to provide a digital transmission of data representative of the input/output values between the network and the computers via the transceiver. An electric cabinet grouping together computers, each computer provided with a transceiver. The electric cabinet includes the input/output device.

17 Claims, 8 Drawing Sheets

(51) Int. Cl.
*G06F 13/20* (2006.01)
*H04B 1/40* (2015.01)
*H04B 10/27* (2013.01)

(56) References Cited

U.S. PATENT DOCUMENTS

| | | | | |
|---|---|---|---|---|
| 2006/0155425 | A1* | 7/2006 | Howlett | G05D 1/0055 |
| | | | | 701/1 |
| 2006/0234787 | A1* | 10/2006 | Lee | H05K 7/1412 |
| | | | | 455/575.7 |
| 2007/0063914 | A1 | 3/2007 | Becker | |
| 2007/0127521 | A1* | 6/2007 | Sandell | H04L 25/05 |
| | | | | 370/466 |
| 2008/0074276 | A1* | 3/2008 | Valencia | G01D 21/00 |
| | | | | 340/635 |
| 2009/0082013 | A1* | 3/2009 | Eckert | H04B 7/18506 |
| | | | | 455/431 |
| 2010/0021174 | A1* | 1/2010 | Truong | H04B 10/40 |
| | | | | 398/101 |
| 2010/0318243 | A1 | 12/2010 | Lewis et al. | |
| 2012/0101663 | A1* | 4/2012 | Fervel | B64C 13/42 |
| | | | | 701/3 |
| 2012/0109424 | A1* | 5/2012 | Fervel | B64C 13/42 |
| | | | | 701/3 |
| 2012/0275795 | A1* | 11/2012 | Chan | H04B 10/1149 |
| | | | | 398/128 |
| 2013/0176398 | A1* | 7/2013 | Bonner | G09F 19/18 |
| | | | | 348/46 |
| 2014/0277784 | A1* | 9/2014 | Mick | G05D 23/1917 |
| | | | | 700/286 |

OTHER PUBLICATIONS

"XMC-FPGAO5D Adaptable I/O PMC/XMC," Dec. 31, 2009, http://www.cwcdefense.com/products/analog-io-digital-io/digital-input-output/xmc-fpga05d.html.

"XMC-FPGAO5F," Dec. 31, 2008, http://www.cwcdefense.com/products/analog-io-digital-io/fiber-optic-io/xmc-fpgaOSf.html.

* cited by examiner

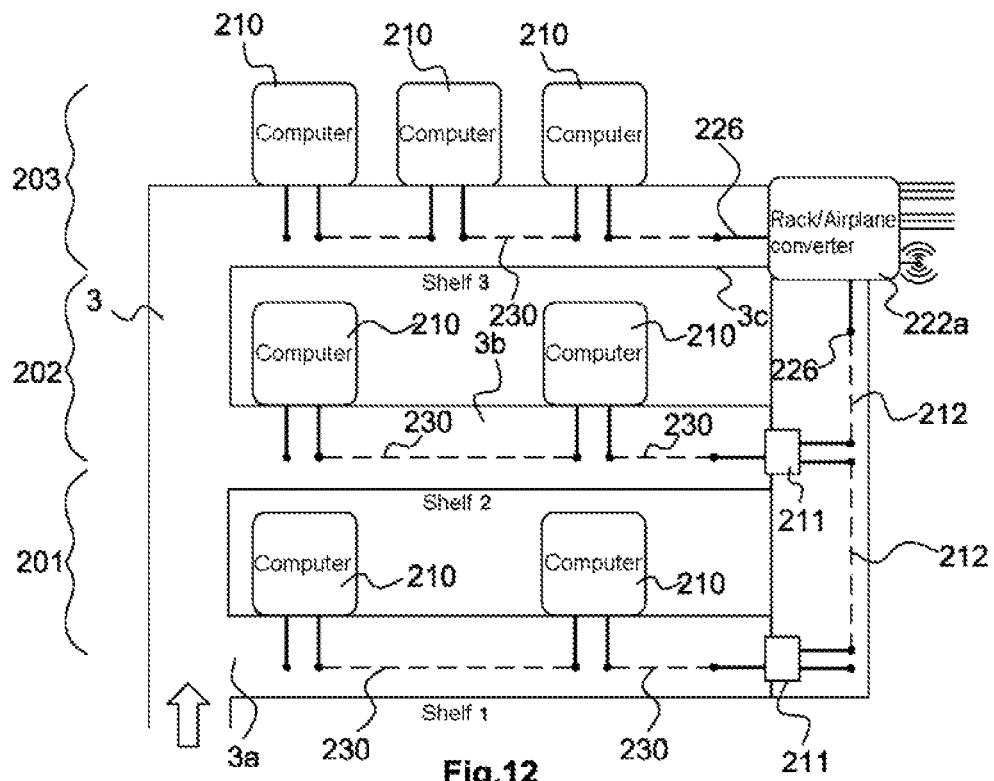
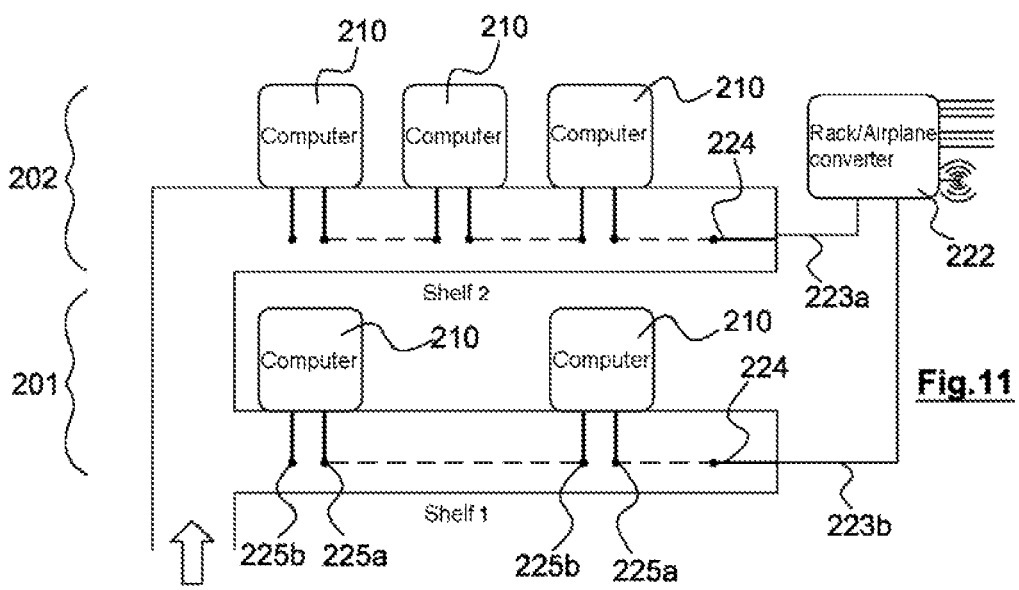

INPUT/OUTPUT DEVICE FOR AN ELECTRONIC CABINET AND CABINET COMPRISING SUCH A DEVICE

RELATED APPLICATIONS

This application is a § 371 application from PCT/EP2014/072203 filed Oct. 16, 2014, which claims priority from French Patent Application No. 13 61177 filed Nov. 15, 2013, each of which is incorporated herein by reference in its entirety.

Field of the Invention

The present invention relates to an input/output equipment item for electronic cabinets and notably electronic cabinets of aircraft electrical or electronic enclosure type.

It applies notably for the cabinets for electronic equipment items such as, for example, the cabinets that group together the computers present in the airplanes.

BACKGROUND OF THE INVENTION

In current aircraft, and notably for maintenance and accessibility reasons, the computers are grouped together in electrical enclosures.

The enclosures, also called electrical or avionics racks, have three main functions. An interconnection function: to connect the computers grouped together in the enclosure between the equipment items and with the apparatus for exchanging data and electrically powering these computers; a mechanical function: to hold the computers of the apparatus in position; a cooling function: the system for cooling the apparatus is directly connected thereto such that cold air circulates in the shelves of the enclosure to directly cool the computers while hot air is also extracted by these shelves.

The technology used for the connections is of the electrical wiring type by means of standardized connectors (connectors known by the acronym ARINC) which are heavy and bulky.

Some links use optical fiber but these connections are few in number.

Each computer is linked to the equipment items of the aircraft by means of a standard connector for example of ARINC 600 type, that is to say a connector with 600 points of connecting and the wiring is of point-to-point type.

More often than not, all of the points of contact of the connector are not used and approximately 30 to 40% of the connection capacity of the connector is used which results in obvious loss of space, excess weight and excess cost.

Furthermore, each change of configuration of the architecture of the computer network leads to a wiring modification procedure that is difficult and costly in terms of time.

For example, for an enclosure or rack of average size for an average civilian mail airplane, the total weight of the cables, of the cable supports and of the connectors is approximately 80 kg whereas the weight of the mechanical structure is close to 70 kg. Thus, the interconnection represents more than 50% of the overall weight of the rack.

The current interconnection solutions in the aircraft are therefore mainly three-dimensional wired networks and all of the wiring is located at the computers in the electrical enclosures.

Trial production of devices for wireless communication between a number of equipment items and using waveguides exist, the document U.S. Pat. No. 8,078,215 for example proposes a waveguide solution comprising a number of points of connection and the document US2010/0318243 proposes using airplane structural parts, the stringers, as waveguide.

OBJECT AND SUMMARY OF THE INVENTION

In light of this prior art, the concept of the present invention is based on a grouping together of the inputs/outputs of the enclosure on a single equipment item linked with the other equipment items of the enclosure by a radiofrequency wireless communication system and on a multifunctional structure comprising a waveguide for the communication system.

For this, the present invention proposes an input/output equipment item, for an electrical or electronic enclosure grouping together a plurality of equipment items such as computers, which comprises:

a plurality of input/output channels and of conversion units, at least one computation unit, the conversion units being linked on the one hand to the input/output channels and on the other hand to said computation unit, a digital network link protocol management unit linked to the computation unit and to at least one transceiver module, and software suitable for performing the transmission in digital form of data representative of input/output values from and to networked computers through the transceiver module.

The software advantageously comprises a module for managing a computer network through the transceiver module.

According to a first embodiment, at least some of the input/output channels are analog channels, the conversion units associated with said analog channels being analog/digital and/or digital/analog conversion units.

According to a second, alternative or complementary, embodiment, at least some of the input/output channels comprise network ports.

According to a third, alternative or complementary, embodiment, at least some of the input/output channels comprise optical channels.

The invention further relates to an electrical enclosure grouping together a plurality of computers each provided with a transceiver module and comprising an input/output equipment item as defined above, the enclosure being provided with an interconnection system for which the transceiver modules are radiofrequency modules and for which the interconnection system comprises a radiofrequency network contained in waveguides associated with the enclosure and linking the transceiver modules of the computers and of the input/output equipment item.

Alternatively, the invention further relates to an electrical enclosure grouping together a plurality of computers each provided with a transceiver module and comprising an input/output equipment item as defined previously and provided with an interconnection system for which the transceiver modules are optical modules and for which the interconnection system comprises an optical network transmitted in waveguides associated with the enclosure and linking optical modules of computers and of the input/output equipment item.

Advantageously, each computer received in the enclosure comprises a pair of transceivers ensuring an optical chaining between computers.

According to a particular embodiment, repeaters link an input/output equipment item to computers on a number of shelves of the enclosure.

According to an alternative or complementary embodiment, the input/output equipment item comprises a plurality of transceiver modules each distributing a different level of the enclosure.

The electrical or electronic enclosure is advantageously such that said input/output equipment item constitutes a protocol converter between the digital network internal to the enclosure and one or more digital networks of an aircraft.

BRIEF DESCRIPTION OF THE DRAWINGS

Other features and advantages of the invention will be apparent on reading the following description of a nonlimiting exemplary embodiment of the invention with reference to the drawings which represent:

FIG. 11: an exemplary embodiment diagram of an architecture with optical links; and, FIG. 12: another exemplary embodiment diagram of architecture with optical links.

DETAILED DESCRIPTION OF EMBODIMENTS OF THE INVENTION

The invention relates firstly to an interconnection system based on a multifunctional enclosure structure and a wireless communication.

Figure 1:
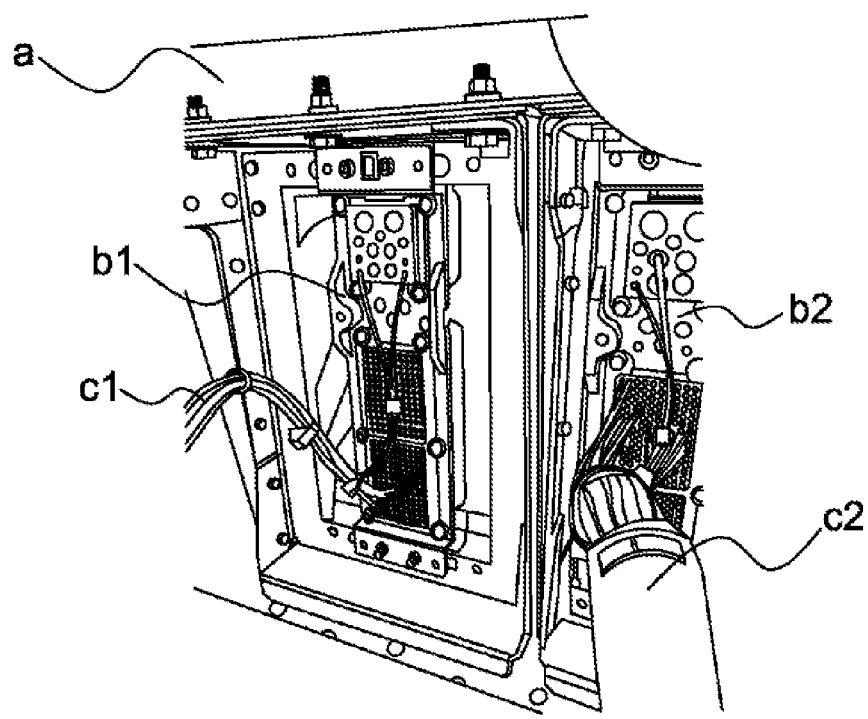
FIG. 1: a rear view of an enclosure of avionics equipment items linked by electrical connectors of the prior art.
Figure 2:
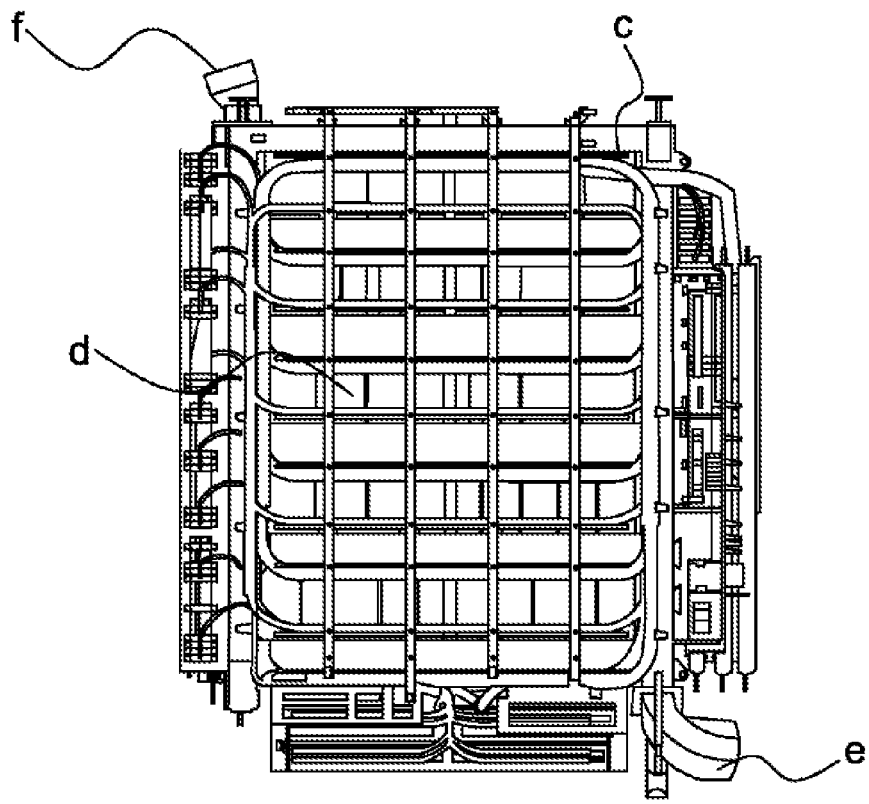
FIG. 2: a schematic view of an electrical enclosure of the prior art.

The prior art concerning avionics enclosures is represented in FIGS. 1 and 2.

FIG. 1 shows a detail of the rear of an enclosure a in which electrical connectors b1, b2 make it possible to link bundles of electrical cables c1, c2 to the computers arranged in the enclosure.

FIG. 2 shows an example of electrical wiring of such an enclosure and the complexity of such wiring c in parallel with the cooling devices e, f of the computers d can easily be seen.

Figure 3:
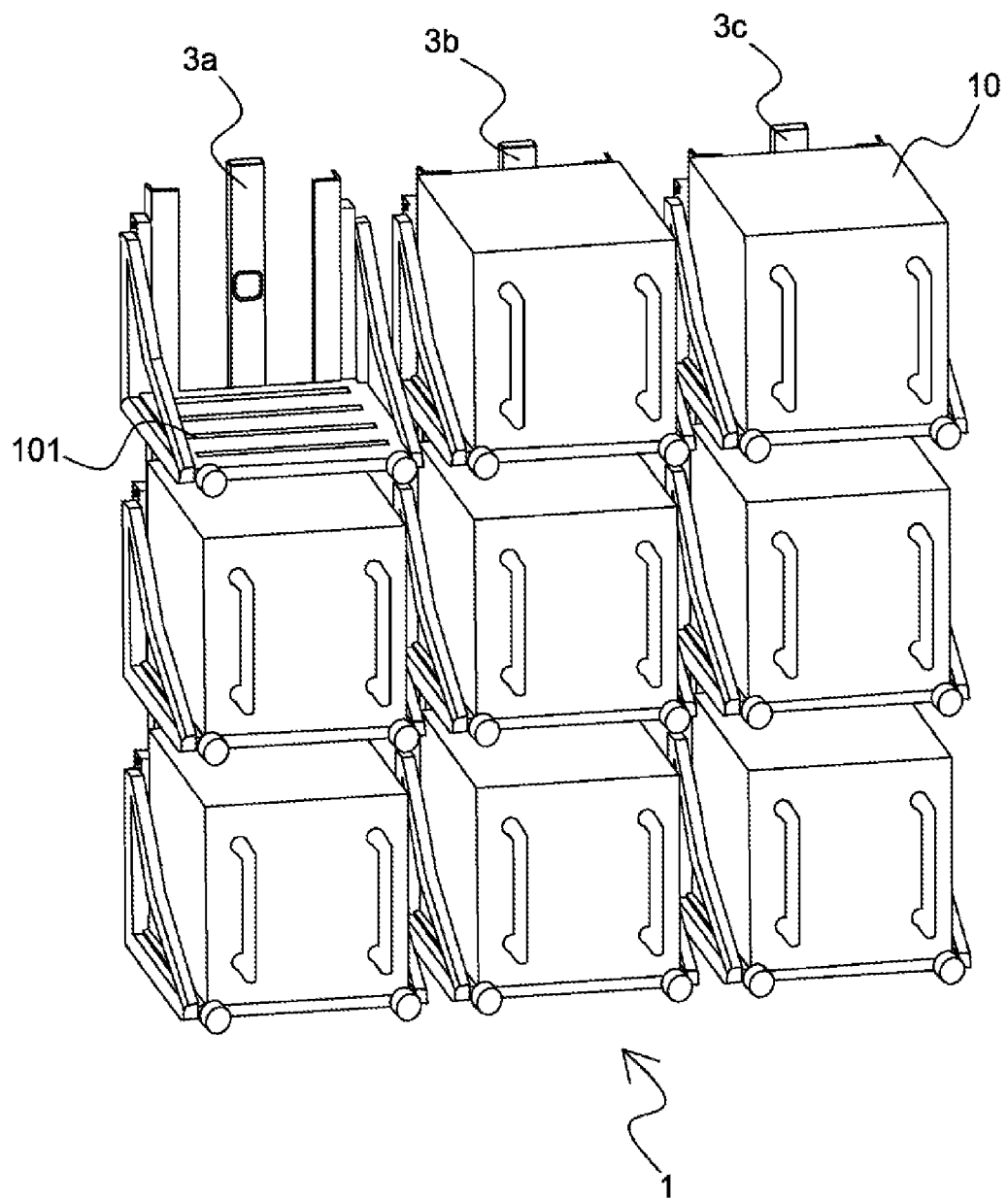
FIG. 3: a three-quarter front schematic view of a first exemplary embodiment of an enclosure according to the invention.
Figure 6:
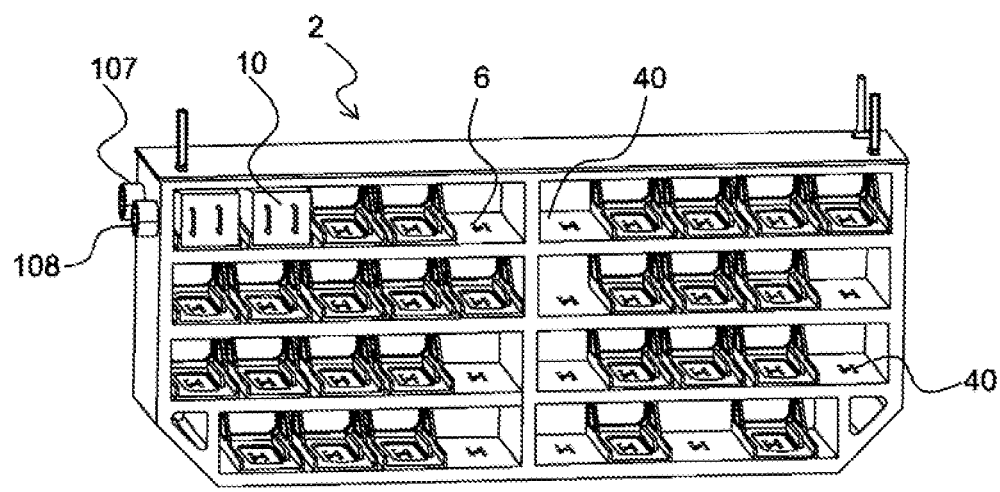
FIG. 6: a perspective schematic view of a second exemplary embodiment of an enclosure according to a variant of the invention.

The multifunctional structure 1, 3 of the present invention which applies to enclosures as represented in FIGS. 3 and 6 aims notably to simplify such enclosures and must ensure, in addition to the transporting of the communication between the computers in the enclosure and the rest of the aircraft, the electrical power supply and ventilation of the equipment items in the electrical or electronic enclosure.

The present invention proposes invariant interfaces between the equipment items arranged in the enclosures and the latter and an architecture based on a standardized topology and network-type communication protocols.

Figure 10:
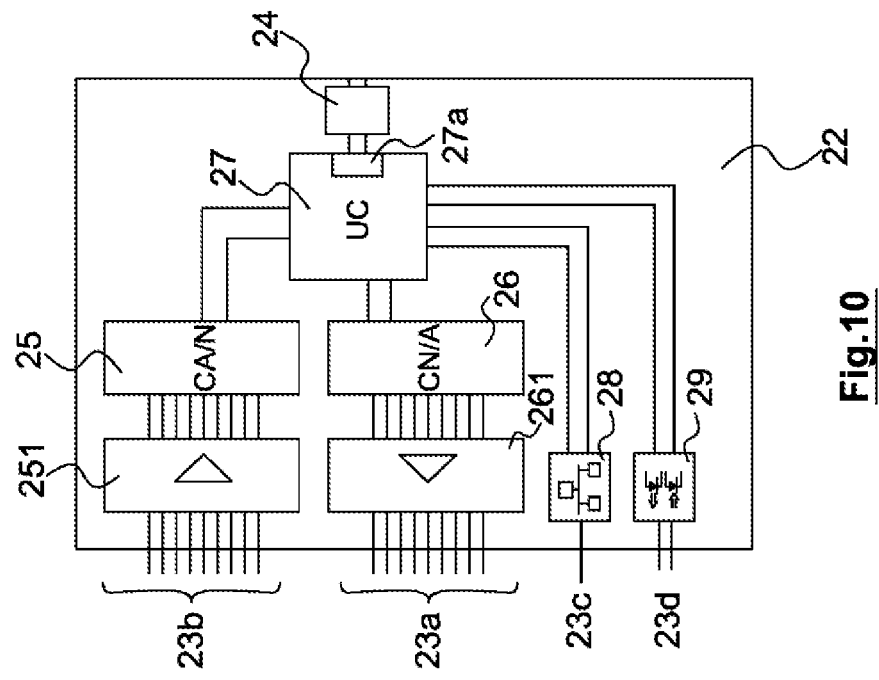
FIG. 10: a schematic view of an input/output equipment item according to the invention.

The basic principle is to simplify the interconnection within the enclosure by using wireless communications propagated in waveguides as represented in FIG. 10.

According to this figure, the wired links 23 to the remote equipment items arranged in the aircraft are grouped together at an enclosure input/output equipment item 22.

This input/output equipment item will incorporate the received data in computer frames transmitted to all the computers in the enclosure and switch the data transmitted by the computers in the enclosure to the equipment items concerned in the aircraft. For this, it comprises a plurality of analog/digital converters 25 and digital/analog converters 26 receiving and transmitting signals from and to wiring sets 23a and 23b linking the system to actuators and sensors of the aircraft. The input/output equipment item comprises a processor 27 adapted to transmit the digitized data between the converters and the computers 10a, . . . 10f of the enclosure according to a network protocol.

The input/output equipment item further comprises a communication module 24 adapted to transmit and receive via an antenna 11 in the waveguide 3 linking the input/output equipment item of the enclosure to the other equipment items 10a, . . . , 10f housed in said enclosure. The communication module operates notably as a router for the network protocol transmitted in the waveguide.

The interconnection within the enclosure uses a radiofrequency wireless communication conveyed by the waveguides 3 in the shelves accommodating the computers.

A wireless communication involves the use of remote transceivers which avoid the use of cables and of connectors.

The transceivers are advantageously the same for all the equipment items of the enclosure such that their connection to the network is an invariant. They comprise an antenna 11 inserted into holes of the waveguides 3 coming into contact with the equipment items 10a, . . . , 10f.

For the electrical power supply for these equipment items, power supply bars 71, 81 distribute the current in the enclosure.

The wireless network communication intrinsically allows for a simplified configuration and reconfiguration by enclosure software because the position of the equipment items of the enclosure is unimportant as long as it remains within the communication zone. The equipment items merely need to send and receive signals whatever their position, the identification of the data and the routing thereof are performed by software in the input/output equipment item.

Numerous wireless technologies and protocols exist and can be used and, for example, the WiFi communication protocol can be used because of its design simplicity. Other protocols and wavelengths are of course possible depending on the performance levels sought.

The use of wireless technologies for communication dictates a significant security level, an absence of outward emission of disturbances and a high order of robustness against disturbances from outside.

A use of the WiFi wireless communication protocol 802.11a with frequencies around 5 GHz makes it possible to have 24 channels with no overlap, each allowing a theoretical bit rate of 54 Mbit/s. Thus, 24 hosts can exchange data in the waveguide with no disturbance. If a number of hosts communicate over the same channel the bit rate is then divided by the number of hosts present on said channel. In the case of an average mail airplane rack of standard type, the most populated shelf supports 9 LRU computers (line replaceable computers). In the worst case, by using a WiFi 802.11a protocol with a single waveguide, a single communication channel will allow an available bandwidth per equipment item of 6 Mbit/s.

Other protocols such as, for example, the UWB protocol can be used to increase the efficiency of the system.

The interconnection system of the invention makes it possible to simplify the communication between the equipment items and the input/output equipment item because this communication is made within the waveguide 3 which makes it possible to insulate the communication from the external disturbances while avoiding, at the same time, having this communication disturb other external equipment items.

Figure 4:
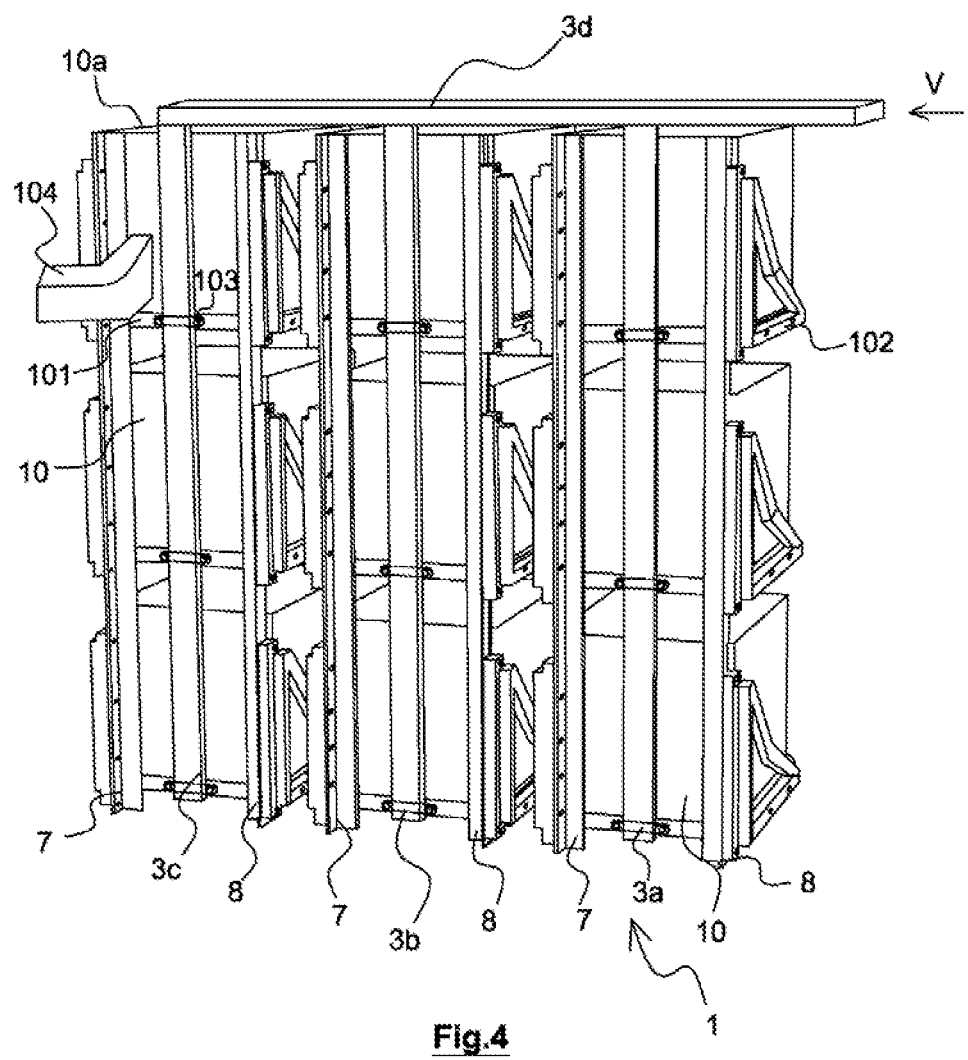
FIG. 4: a three-quarter rear schematic view of the enclosure of FIG. 3.
Figure 5:
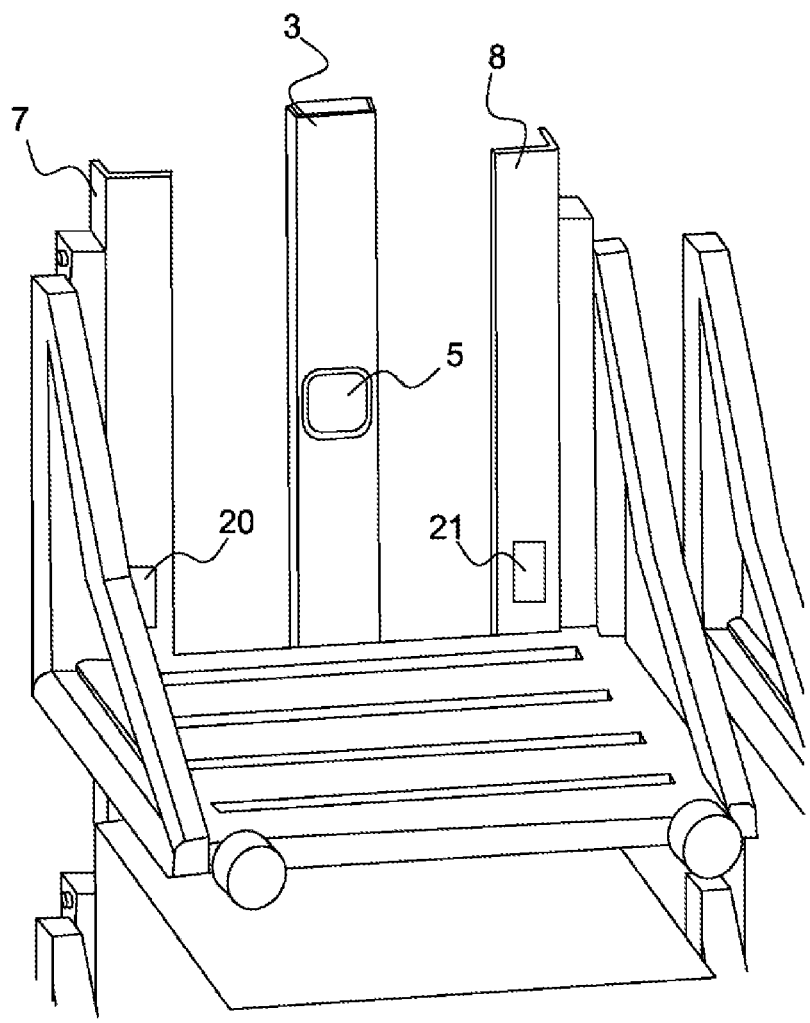
FIG. 5: a three-quarter front detail of the enclosure of FIG. 3.

A first exemplary embodiment is described in FIGS. 3, 4 and 5.

FIG. 3 represents an enclosure 1 equipped with equipment items 10 of computer type on shelves 101. According to this example, and as represented more particularly in FIG. 4 vertical waveguides 3a, 3b and 3c link the computers one above the other.

According to FIG. 5 in particular, the waveguide comprises holes 5 facing the rear of the equipment items 10 to receive antennas of the equipment items.

According to an advantageous embodiment of the invention which uses the hollow waveguides as ventilation ducts, the holes 5 serve as ventilation orifices in order to provide cool air to the equipment items.

Vertical bars 7 and 8 make it possible to deliver the electrical power supply for the computers through electrical contact zones 20 and 21. The connection between these conductor elements and the equipment items is made for example by flat contacts on the bars and piston contacts of known type at the rear of the computers in order to minimize the stresses/tolerances of production and assembly of the structure (no alignment necessary) thus making it possible to eliminate heavy and costly mechanical elements.

For example, the electrical contacts between the enclosure and the computers can for example be flat contacts with plates as marketed by the company Multi-Contact.

The equipment items are fixed in the enclosure by conventional means that are not represented.

The bars 7 and 8 and the waveguides 3a, 3b, 3c made of metallic material are here also structural elements of the enclosure which, as represented in FIG. 4, support the shelves through, here, fixing tabs 103 welded or fixed in any way onto the waveguides and screwed at the rear of the shelves 101, through brackets 102 fixed onto the power supply bars 7, 8 and onto which the lateral edges of the shelves are fixed.

As seen above, the hollow waveguides 3 are also used as ventilation duct for the various equipment items. Here, a horizontal waveguide 3d links the waveguides 3a, 3b, 3c and comprises a blown air input V.

The input/output equipment item is for example the equipment item 10a top left in FIG. 4 which then comprises a bundle of cables schematically represented under the reference 104.

In this example, the air outlet for the equipment items is toward the outside.

The waveguides are also possibly configured to serve as functional current return element for the equipment items which are connected thereto.

The use of wireless communication between the electronic equipment items allows for an installation time saving but also makes it possible to notably reduce the weight because there are no longer numerous cables and connectors. The waveguides act as wiring while offering a better protection against interference and a greater modularity.

To add or remove a computer in the communication network, the only thing to be done, apart from the mechanical fixing or dismantling, is to position or remove its antenna on or from the waveguide and apply the power supply contacts onto the power supply bars.

Furthermore, because of the very low attenuation of the signal in the waveguides in the enclosure, a very low power is necessary for the network.

In an alternative embodiment, the enclosure for electrical equipment items of the invention is, according to FIG. 6, an enclosure 3 for which the waveguides are incorporated in shelves 40 bearing rows of equipment items 10.

This design is particularly suitable for producing compact enclosures and for optimizing the ventilation of the equipment items 10.

The shelves of the enclosure extend longitudinally over the entire width of the enclosure under the equipment items. They are divided transversely into sections adapted for different functions, at least one of these sections being used as waveguide.

Figure 7:
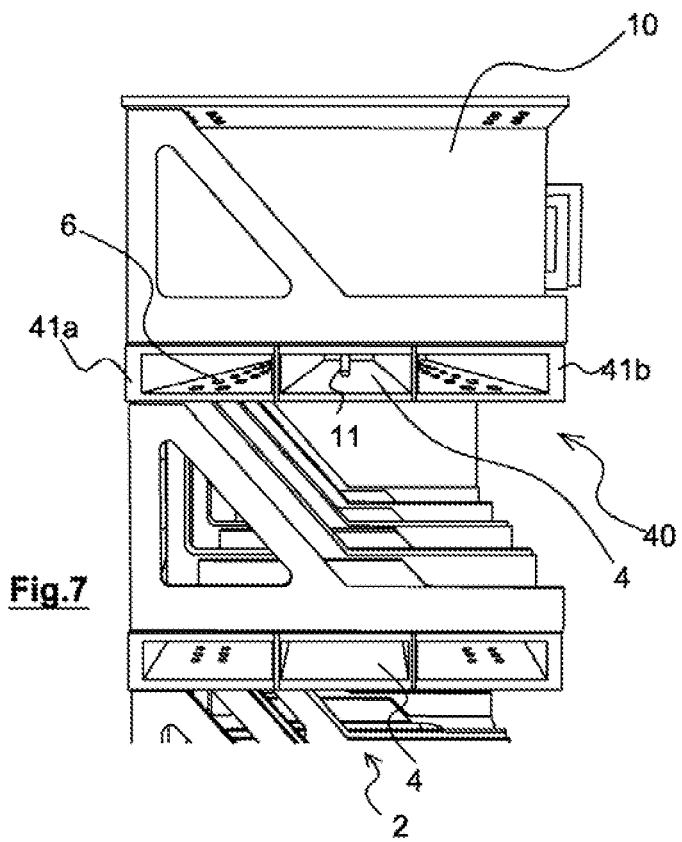
FIG. 7: a perspective view of a transverse section of the enclosure of FIG. 6.
Figure 8:
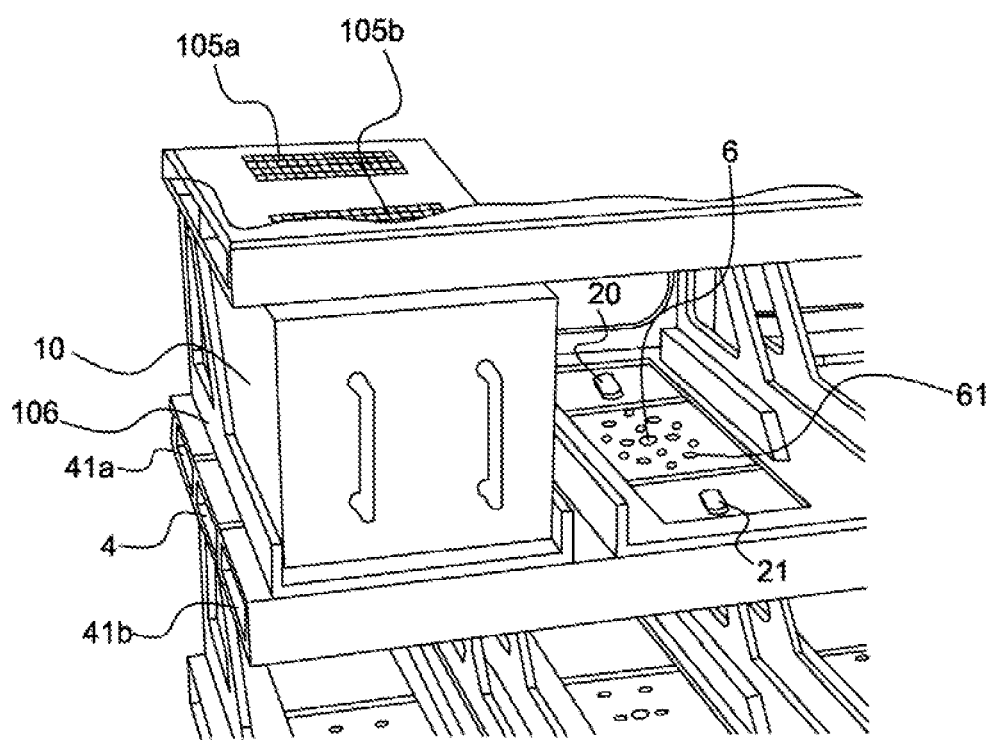
FIG. 8: a three-quarter front detail of the enclosure of FIG. 6.

According to FIGS. 6 to 8, three sections are produced. The central section 4 is dedicated to the cold air inlet, the wireless communication and a current return.

The sections 41a, 41b surrounding the central section are used to extract hot air from the computers and provide the electrical power supply to these computers.

These ducts 4, 41a, 41b are conductors of electricity and are for example insulated from one another by plastic rods or plates that are not represented.

They can also be coated with a thermal and electrical insulation material comprising holes in the computer coupling zones.

According to FIG. 8, the central section comprises holes 6 emerging under the equipment items 10 to receive the antennas 11, represented in FIG. 7, and holes 61 to allow cooling air to pass to the equipment items which are cooled from below in this case.

The apertures or holes 6, 61 are produced with a dimension less than a quarter of the wavelength $\lambda/4$ of the electromagnetic waves which can not therefore pass through these holes.

For 2.4 GHz WiFi, the wavelength is 12.5 cm. The diameter of the apertures is chosen to be less than 3 cm so that the apertures act as low-pass filter and do not allow the waves to pass.

According to FIG. 8 in particular, the equipment items 10 are arranged in cradles 106 comprising an open bottom to allow the passage of the antenna and of the air in the central section produced by the waveguide 4 and to make it possible to connect the power supply for the equipment item by means of electrical contacts 20, 21 arranged on the sections 41a and 41b on either side of the central section.

According to FIG. 7, the sections 41a, 41b are provided on their bottom face with apertures 6 for extracting air from the equipment items which are, for their part, provided with aeration holes 105a, 105b on the top face as represented in FIG. 8.

Obviously, the rectangular tube sections forming the shelves are assembled together through electrical insulation means, for example the cradles 106 which can be produced from non-conductive composite materials.

To return to FIG. 6, the lateral ends of the enclosures comprise coupling ducts 107, 108 for the ventilation and are provided with means for coupling the waveguides between the various shelf levels.

A rack architecture that is optimized for example by having input/output equipment items for each level can significantly increase the individual bandwidth by reducing the number of computers communicating over the same channel. The use of another protocol such as the UWB protocol for example can also increase the theoretical bandwidth for the complete system.

The invention thus provides flexibility in the production of the electronic enclosures or racks notably in aircraft by reducing the number of electrical connection points and cables which is favorable to the reliability of the systems and their weight. The invention also makes it possible to standardize and simplify the interface of the avionics equipment items which reduces the cost thereof.

Figure 9:
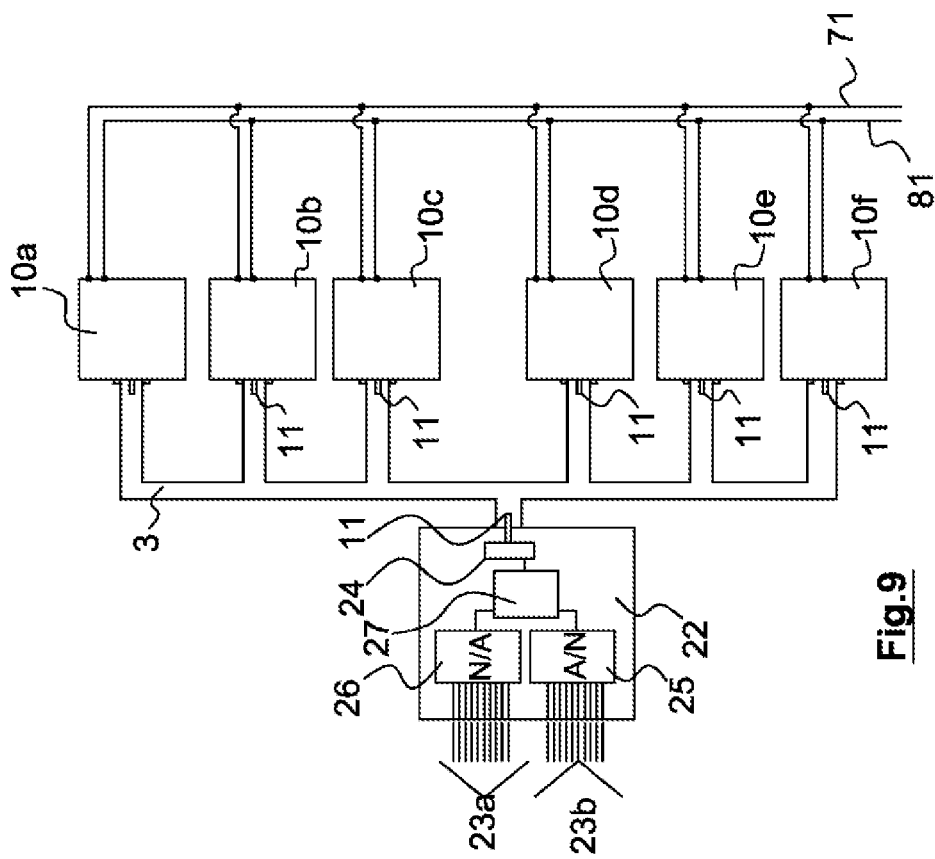
FIG. 9: a schematic view of an interconnection system of the invention.

The invention according to FIG. 9 is based on an input/output equipment item 22, for an electrical or electronic enclosure grouping together a plurality of equipment items such as computers.

According to FIG. 10, the input/output equipment item comprises a plurality of analog input/output paths 23a, 23b and conversion units consisting of analog/digital converters 25 and digital/analog converters 26, an input/output path of network port type 23c and an optical input/output path 23d.

The analog input paths comprise a formatting and/or protection step 251 upstream of the analog/digital converters 25 and the analog output paths of the power stages 261 at the output of the digital/analog converters 26.

The conversion units are linked to a computation unit 27 of microcomputer type comprising a microprocessor, mass memory, RAM memory and an internal program.

The equipment item further comprises a digital network link protocol management unit 27a linked to the computation unit and to a transceiver module 24.

The input/output equipment item comprises software suitable for performing the transmission in digital form of data representative of input/output values from and to the network computers through the transceiver module.

The software can be of a type suited to passive transmission which merely transmits the input data with the number of the input on the network of the enclosure and assigns the output data to the outputs as determined by the computers, or be software suitable for transmitting dedicated frames for the computers of the enclosure and for retranscribing the output data on reception of standardized frames from the computers of the enclosure.

The software notably comprises a computer network management module through the transceiver module and operate as router for the network.

The input/output equipment item can also have a data server function for the equipment items or computers of the enclosure. It can constitute a protocol converter between the network internal to the enclosure and one or more networks of an aircraft.

The interconnection system of the enclosure can comprise a radiofrequency network confined in the waveguides associated with the enclosure and linking the transceiver modules of the computers and of the input/output equipment item. The interconnection system can alternatively comprise a network of optical waveguides associated with the enclosure and linking the optical modules of the computers and of the input/output equipment item.

The examples of FIGS. 11 and 12 are variant embodiments for which the communication between an input/output equipment item 222, 222a or airplane rack converter, and the computers 210 is at least partly optical.

In the example of FIG. 11, the input/output equipment item 222 comprises two links 223a, 223b terminated by optical transceivers 224 for each to transmit and receive an optical beam on a level 201, 202 of an enclosure of the invention. The input/output equipment item in this case comprises two transceivers 225.

Each computer 210 itself comprises a pair of optical transceivers 225a, 225b which ensure the continuity of the two-way optical link 230 on each level of the enclosure between the computers.

In the case of FIG. 12, the rack/airplane converter input/output equipment item distributes one shelf 203 of the enclosure through a direct output 226 and two shelves 201, 202 through repeaters 211 linked to the input/output equipment item by a two-way optical link 212. The input/output equipment item in this case comprises three transceivers 226.

Such a system uses the ventilation ducts 3, 3a, 3b, 3c to contain the optical signals. A filtration is in this case desirable to avoid polluting the optical transceivers.

As in the version with radiofrequency transmission/reception, the computers or equipment items 210 can be standardized and incorporated simply in the enclosure.

The beams for transmission/reception can be produced in visible light, infrared or ultraviolet. The optical transceivers of the computers are, just like the antennas of the radiofrequency system, inserted into the ventilation tubes 3, 3a, 3b, 3c through apertures dimensioned to oppose the passage of ambient electromagnetic waves.

The invention is not limited to the examples represented and it is for example possible to combine a radiofrequency network and an optical network in the context of the invention.

The invention claimed is:

1. An avionics enclosure grouping together a plurality of computers, each computer provided with a transceiver, and the avionics enclosure comprising:
    an input/output equipment item at an enclosure input, said input/output equipment item comprising:
        a plurality of input/output channels to receive and send signals from and to avionics equipment items external to the avionics enclosure;
        conversion units;
        at least one computation unit, the conversion units linked to the input/output channels and to said computation unit to convert the received signals from the input/output channels into computer data for the computers from the plurality of computers and to convert the computer data from the computers into said signals for transmission by the input/output channels;
        a digital network link protocol management unit linked to the computation unit and to at least one transceiver of each of the computers;
        wherein the computation unit executes software to transform and transmit in a digital form of data representative of input/output values from and to the computers through said at least one transceiver; and,
        a control unit to manage a computer network through said at least one transceiver; and
    a plurality of shelves supporting the computers, wherein the shelves are supported by power supply bars extending between the computers, the power supply bars configured to supply power for the computers via electrical contact with contact zones on the power supply bars, and, waveguides extending between said input/output equipment item and the computers, the waveguides configured to relay radiofrequency and optical signals, wherein the waveguides comprise structural elements of the avionics enclosure, wherein both the waveguides and the power supply bars are attached to the shelves such that both the waveguides and the power supply bars support at least a portion of the weight of the shelves and computers.

2. The avionics enclosure as claimed in claim 1, wherein the transceivers are radiofrequency transceivers; and wherein the interconnection system comprises a radiofrequency network transmitted in the waveguides.

3. The avionics enclosure as claimed in claim 1, wherein the transceivers are optical transceivers; and wherein the interconnection system comprises an optical network transmitted in the waveguides.

4. The avionics enclosure as claimed in claim 3, wherein each computer in the avionics enclosure comprises a pair of transceivers to ensure an optical chaining between the computers.

5. The avionics enclosure as claimed in claim 3, further comprising repeaters to link said input/output equipment item to the computers on the shelves from the plurality of shelves.

6. The avionics enclosure as claimed in claim 1, wherein said input/output equipment item comprises a plurality of transceivers, each transceiver distributing at a different level of the avionics enclosure.

7. The avionics enclosure as claimed in claim 1, wherein said input/output equipment item comprises a protocol converter between a digital network internal to the avionics enclosure and one or more digital networks of an aircraft.

8. The avionics enclosure as claimed in claim 1, wherein at least some of the input/output channels of said input/output equipment item are analog channels, the conversion units associated with said analog channels are at least one of analog/digital and digital/analog conversion units.

9. The avionics enclosure as claimed in claim 1, wherein at least some of the input/output channels of said input/output equipment item comprise network ports.

10. The avionics enclosure as claimed in claim 1, wherein at least some of the input/output channels of said input/output equipment item comprise optical channels.

11. The avionics enclosure as claimed in claim 1, wherein the waveguides comprise hollow, metal conduits.

12. The avionics enclosure as claimed in claim 1, wherein the waveguides comprise ventilation ducts.

13. The avionics enclosure as claimed in claim 1, wherein the waveguides comprise a plurality of apertures.

14. The avionics enclosure as claimed in claim 1, wherein the waveguides comprise at least one vertical waveguide and at least one horizontal waveguide.

15. An avionics enclosure for grouping together a plurality of computers, each computer provided with an antenna, and the avionics enclosure comprising:

a plurality of shelves, each shelf configured to receive at least one of the computers from the plurality of computers;

a plurality of bars extending between the shelves from the plurality of shelves and supporting the shelves from the plurality of shelves, the bars including a plurality of electrical contact zones for supplying electrical power supply to each of the computers from the plurality of computers via electrical contact with the electrical contact zones on the bars; and, at least one waveguide extending between the shelves from the plurality of shelves, the at least one waveguide configured to rely radiofrequency and optical signals to each of the computers from the plurality of computers, wherein the at least one waveguide comprises a plurality of apertures each configured to receive an antenna from one of the computers from the plurality of computers, wherein the at least one waveguide comprises a structural element of the avionics enclosure for supporting the shelves, wherein both the waveguides and the power supply bars are attached to the shelves such that both the waveguides and the power supply bars support at least a portion of the weight of the shelves and computers.

16. The avionics enclosure of claim 15, wherein the at least one waveguide is configured to receive cooling air and to distribute the cooling air to the computers from the plurality of computers.

17. The avionics enclosure of claim 15 further comprising a plurality of waveguides, wherein the waveguides are incorporated into the shelves from the plurality of shelves.

* * * * *